United States Patent
Matsuoka et al.

(10) Patent No.: US 12,459,046 B2
(45) Date of Patent: Nov. 4, 2025

(54) ARC WELDING CONTROLLING METHOD

(71) Applicant: Panasonic Intellectual Property Management Co., Ltd., Osaka (JP)

(72) Inventors: Noriyuki Matsuoka, Osaka (JP); Masaru Kowa, Osaka (JP); Takamichi Komatsu, Osaka (JP); Kimiya Sato, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 706 days.

(21) Appl. No.: 16/909,541

(22) Filed: Jun. 23, 2020

(65) Prior Publication Data
US 2020/0316703 A1 Oct. 8, 2020

Related U.S. Application Data

(63) Continuation of application No. PCT/JP2018/046682, filed on Dec. 19, 2018.

(30) Foreign Application Priority Data

Jan. 24, 2018 (JP) .................................. 2018-009888

(51) Int. Cl.
*B23K 9/09* (2006.01)
*B23K 9/095* (2006.01)
*B23K 9/173* (2006.01)

(52) U.S. Cl.
CPC ............... *B23K 9/09* (2013.01); *B23K 9/095* (2013.01); *B23K 9/173* (2013.01)

(58) Field of Classification Search
CPC .......... B23K 9/09; B23K 9/095; B23K 9/173; B23K 9/0953; B23K 8/124
See application file for complete search history.

(56) References Cited

U.S. PATENT DOCUMENTS 6,177,650 B1 1/2001 Watanabe et al.
2007/0034611 A1* 2/2007 Drius .................. B23K 11/046
219/101

(Continued)

FOREIGN PATENT DOCUMENTS

EP 584643 3/1994
JP 61-202774 9/1986

(Continued)

OTHER PUBLICATIONS

Welder Academy, Step-By-Step—How to Prevent Bubbles in Your Welds, https://welderacademy.com/step-by-step-how-to-prevent-bubbles-in-your-welds/ (Year: 2022).*

(Continued)

*Primary Examiner* — Ibrahime A Abraham
*Assistant Examiner* — Franklin Jefferson Wang
(74) *Attorney, Agent, or Firm* — WENDEROTH, LIND & PONACK. L.L.P.

(57) ABSTRACT

An arc welding control method includes: an initial condition setting step of setting initial values of welding conditions for arc welding a base material; and a scaly bead formation step of forming a plurality of scaly beads in a predetermined welding section of the base material while moving a welding wire at a predetermined welding speed in the predetermined welding section of the base material. The welding conditions include an arc ON period and an arc OFF period, and at least one of a welding current, the predetermined welding speed, or an interval of the plurality of scaly beads. The arc welding control method further includes a welding condition change step of determining whether to change the initial value based on a predetermined finish condition for the plurality of scaly beads and changing at least one of a plurality of welding parameters to satisfy the predetermined finish condition.

15 Claims, 8 Drawing Sheets

(56) References Cited

U.S. PATENT DOCUMENTS

| | | | | |
|---|---|---|---|---|
| 2011/0297658 | A1* | 12/2011 | Peters | B23K 26/1423 |
| | | | | 219/162 |
| 2012/0199567 | A1* | 8/2012 | Nakagawa | B23K 9/173 |
| | | | | 219/137 R |
| 2013/0299476 | A1* | 11/2013 | Fujiwara | B23K 9/124 |
| | | | | 219/130.51 |
| 2014/0110385 | A1* | 4/2014 | Hearn | B23K 9/1006 |
| | | | | 219/130.1 |
| 2014/0124491 | A1 | 5/2014 | Daniel et al. | |
| 2014/0203003 | A1* | 7/2014 | Fujiwara | B23K 9/0956 |
| | | | | 219/130.21 |
| 2015/0076119 | A1 | 3/2015 | Hsu et al. | |
| 2017/0036288 | A1* | 2/2017 | Albrecht | B23K 31/125 |
| 2017/0157693 | A1* | 6/2017 | Albrecht | B23K 9/0282 |
| 2017/0225253 | A1 | 8/2017 | Matsuoka et al. | |
| 2017/0246701 | A1* | 8/2017 | Wahlen | B23K 9/173 |
| 2017/0355034 | A1* | 12/2017 | Matsuoka | B23K 9/125 |
| 2019/0061052 | A1* | 2/2019 | Hsu | B23K 26/0096 |
| 2019/0084068 | A1* | 3/2019 | Furuyama | B23K 9/02 |

FOREIGN PATENT DOCUMENTS

| | | |
|---|---|---|
| JP | 1-237077 | 9/1989 |
| JP | 6-055268 | 3/1994 |
| JP | 8-155644 | 6/1996 |
| JP | 8-257751 | 10/1996 |
| JP | 9-220667 | 8/1997 |
| JP | 10-006005 | 1/1998 |
| JP | 2006-130535 | 5/2006 |
| JP | 2009-119474 | 6/2009 |
| JP | 2009119474 A * | 6/2009 |
| JP | 2009-154206 | 7/2009 |
| JP | 2009154206 A * | 7/2009 |
| JP | 2014-087818 | 5/2014 |
| JP | 2015-533347 | 11/2015 |
| WO | 2016/059805 | 4/2016 |
| WO | 2018/043626 | 3/2018 |

OTHER PUBLICATIONS

JP 2009154206 A (Uesono Toshiro) Jul. 16, 2009 [retrieved on Oct. 7, 2024]. Retrieved from Espacenet Database, translation by EPO and Google. (Year: 2009).*

Indian Examination Report issued Apr. 1, 2022 in related Indian Patent Application No. 202047035490.

International Search Report of PCT application No. PCT/JP2018/046682 dated Mar. 26, 2019.

Extended European Search Report issued Mar. 9, 2021 in European Patent Application No. 18901824.5.

* cited by examiner

WELDING SECTION

ARC WELDING CONTROLLING METHOD

TECHNICAL FIELD

The present disclosure relates to an arc welding controlling method by which welding is performed using an arc generated between a welding wire that is a consumable electrode and a base material that is a welding target.

BACKGROUND ART

In the manufacturing process of automobiles or motorcycles, non-consumable electrode tungsten inert gas (TIG) welding is widely used to achieve aesthetically rippled welding beads (hereinafter, called scaly beads). In recent years, there has been increasing demand for replacing non-consumable electrode TIG welding with consumable electrode metallic inert gas (MIG) welding or metal active gas (MAG) welding from the viewpoint of improvement in productivity. In the non-consumable electrode TIG welding, the electrode is not melted and there is a need to supply a filler material separately from the electrode for welding of a strength part requiring higher extra filling of beads.

On the other hand, the consumable electrode MIG welding or MAG welding is performed by flowing current into a welding wire as an electrode to melt the welding wire with the use of an arc generated between the welding wire and the base material. This provides high deposition efficiency and increases the welding speed.

Unexamined Japanese Patent Publication No. 6-055268 discloses intermittent welding as a welding method for forming scaly beads by consumable electrode MIG welding or MAG welding. According to the intermittent welding, a series of operations is repeated: performing welding with a torch stopped for an arc ON period; stopping the torch for an arc OFF period; and moving the torch to a next welding point still in the arc OFF state to solidify the base material.

SUMMARY OF THE INVENTION

Technical Problem

Unexamined Japanese Patent Publication No. 6-055268 does not disclose a technique for facilitating change and adjustment of welding conditions.

The present disclosure is devised in light of this point. An object of the present disclosure is to provide an arc welding control method for forming scaly beads that facilitates change and adjustment of welding conditions.

Solution to Problem

To attain the foregoing object, the arc welding control method according to the present disclosure is an arc welding control method for controlling arc welding, the arc welding forming a plurality of scaly beads continuously arranged on a base material in a welding cycle, the welding cycle being a sum of an arc ON period and an arc OFF period, the arc ON period being a period during which a welding current flows to a welding wire, the arc OFF period being after the arc ON period and during which the welding current does not flow to the welding wire. The arc welding control method includes: an initial condition setting step of setting the initial value of a welding condition for arc-welding the base material; and a scaly bead formation step of forming the plurality of scaly beads in a predetermined welding section of the base material while moving the welding wire in the predetermined welding section of the base material at a predetermined welding speed. The welding condition includes the arc ON period, the arc OFF period, and a plurality of welding parameters, the plurality of welding parameters including at least one of the welding current, the welding speed, and an interval between adjacent scaly beads among the scaly beads. The arc welding control method further includes a welding condition change step of, before the scaly bead formation step, determining whether to change the initial value based on a predetermined finish condition for the scaly beads, and when a result of the determining is affirmative, changing at least one of the plurality of welding parameters so as to satisfy the predetermined finish condition.

Advantageous Effect of Invention

According to the present disclosure, it is possible to eliminate a need for complicated adjustments between the plurality of welding parameters and make an outer appearance of the scaly beads in a desired finish shape. In addition, it is possible to favorably keep quality of welding at a welding spot.

DESCRIPTION OF EMBODIMENTS

Hereinafter, exemplary embodiments will be described in detail with reference to the drawings. The following description of a preferred exemplary embodiment is merely illustrative in nature and is not intended to limit the present disclosure, application, or uses.

First Exemplary Embodiment

[Configuration and Operations of Arc Welding Apparatus]

Figure 1:
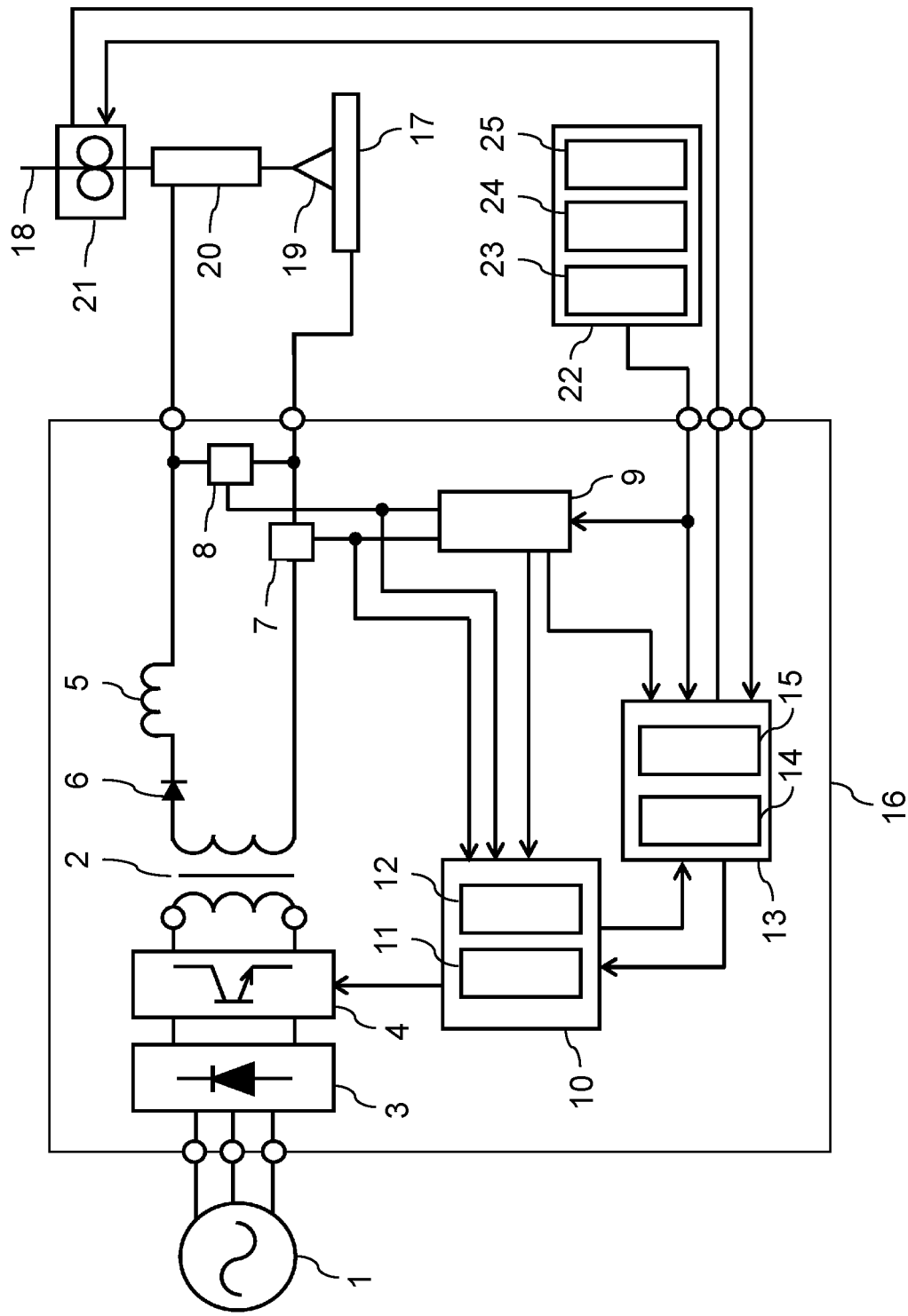
FIG. 1 is a diagram showing a schematic configuration of an arc welding apparatus according to a first exemplary embodiment of the present disclosure.

FIG. 1 is a schematic configuration diagram of an arc welding apparatus according to the present exemplary embodiment. Arc welding apparatus 16 uses welding wire 18 as a consumable electrode to weld base material 17 as a welding target. Welding wire 18 is held on a torch not shown. When the torch moves at a predetermined speed, a leading end of welding wire 18 moves in the same manner along a predetermined welding section at the same speed as the torch.

Arc welding apparatus 16 includes main transformer 2, primary side rectifier 3, switcher 4, DCL (reactor) 5, secondary side rectifier 6, welding current detector 7, welding voltage detector 8, control switcher 9, output controller 10, and wire feed speed controller 13. Arc welding apparatus 16 also has a robot controller (not shown) that controls operations of a robot (not shown) holding the torch (not shown).

Output controller 10 has short-circuit welding controller 11 and pulse welding controller 12. Wire feed speed controller 13 has wire feed speed detector 14 and arithmetic operation unit 15. Primary side rectifier 3 rectifies an input voltage received from an input power supply (three-phase alternating-current power supply) 1 disposed outside arc welding apparatus 16. Switcher 4 controls an output of primary side rectifier 3 to an output suited to welding. Main transformer 2 converts an output of switcher 4 to an output suited to welding.

Secondary side rectifier 6 rectifies an output of main transformer 2. DCL (reactor) 5 smoothes an output of secondary side rectifier 6 to a current suited to welding. Welding current detector 7 detects a welding current. Welding voltage detector 8 detects a welding voltage.

Control switcher 9 is a switcher that outputs to output controller 10 a timing for switching from a control of short circuit welding to a control of pulse welding, from pulse welding to a cooling period. Control switcher 9 has a timer function, and outputs a timing for control switching to output controller 10 and wire feed speed controller 13 based on a predetermined time set by welding condition setter 22. The "cooling period" refers to a period during which welding current I is set to zero, and an amount of heat input from an arc becomes zero in this period (see FIG. 2).

Output controller 10 outputs a control signal to switcher 4 to control a welding output. When control switcher 9 issues an instruction for short-circuit welding, short-circuit welding controller 11 controls short-circuit welding. When control switcher 9 issues an instruction for pulse welding, pulse welding controller 12 controls pulse welding.

Wire feed speed controller 13 controls wire feeder 21 to control a feed speed of welding wire 18. Wire feed speed detector 14 detects the wire feed speed. Arithmetic operation unit 15 calculates an accumulated amount of feed amount of welding wire 18 based on the signal from wire feed speed detector 14, and controls the wire feed speed. Specifically, arithmetic operation unit 15 compares an instructive value and a detection value of the wire feed speed to determine a difference, and performs a feedback control to match the actual wire feed speed to the instructive value.

Arc welding apparatus 16 is connected to wire feeder 21 and welding condition setter 22. Welding condition setter 22 is used to set the welding condition to arc welding apparatus 16. Welding condition setter 22 has short-circuit setter 23, pulse welding setter 24, and cooling period setter 25. Wire feeder 21 controls feed of welding wire 18 based on a signal from wire feed speed controller 13.

A welding output of arc welding apparatus 16 is supplied to welding wire 18 via welding chip 20 when a torch switch (SW) not shown is turned on. Then, the welding output of arc welding apparatus 16 generates arc 19 between welding wire 18 and base material 17 as a welding target.

Next, operations of arc welding apparatus 16 that is configured as described above to provide a control method of arc welding for forming scaly beads will be described with reference to FIG. 2. In the present exemplary embodiment, arc welding apparatus 16 performs short circuit welding and pulse welding in order, and then provides a cooling period during which the welding current becomes zero such that the amount of heat input by the arc becomes zero. The torch (not shown) holding welding wire 18 is controlled to move in a predetermined section where welding is performed at a constant speed. Conventional stitch welding is intermittent welding for forming scaly beads by repeating: performing welding using a positioning jig such as a robot holding a torch, a positioner for positioning base material 17 as a welding target, or a positioning table, or manually while the movement of the torch is stopped; after the welding is temporarily stopped, relatively moving the torch to a next teaching point; and performing welding while the movement of the torch is stopped at the teaching point, in other words, by intermittent movement with repeats of stoppage and movement. In contrast to this, in the present exemplary embodiment, for example, continuous welding is performed for forming scaly beads by continuously moving the torch in a predetermined section such that the welding speed is kept constant, in other words, by continuous movement. The welding speed may not be constant over the entire welding spot of base material 17. For example, the welding speed may be changed at a part of base material 17 with a change in the plate thickness. In the exemplary embodiment of the present disclosure, scaly beads can be formed by continuous movement, which makes it possible to perform high-quality and stable welding by continuous operations without influence of vibration that would be caused by a positioning mechanism such as robot, positioner, or positioning table repeating stoppage and movement or setting time that is a stabilization time until the vibration is settled.

Figure 2:
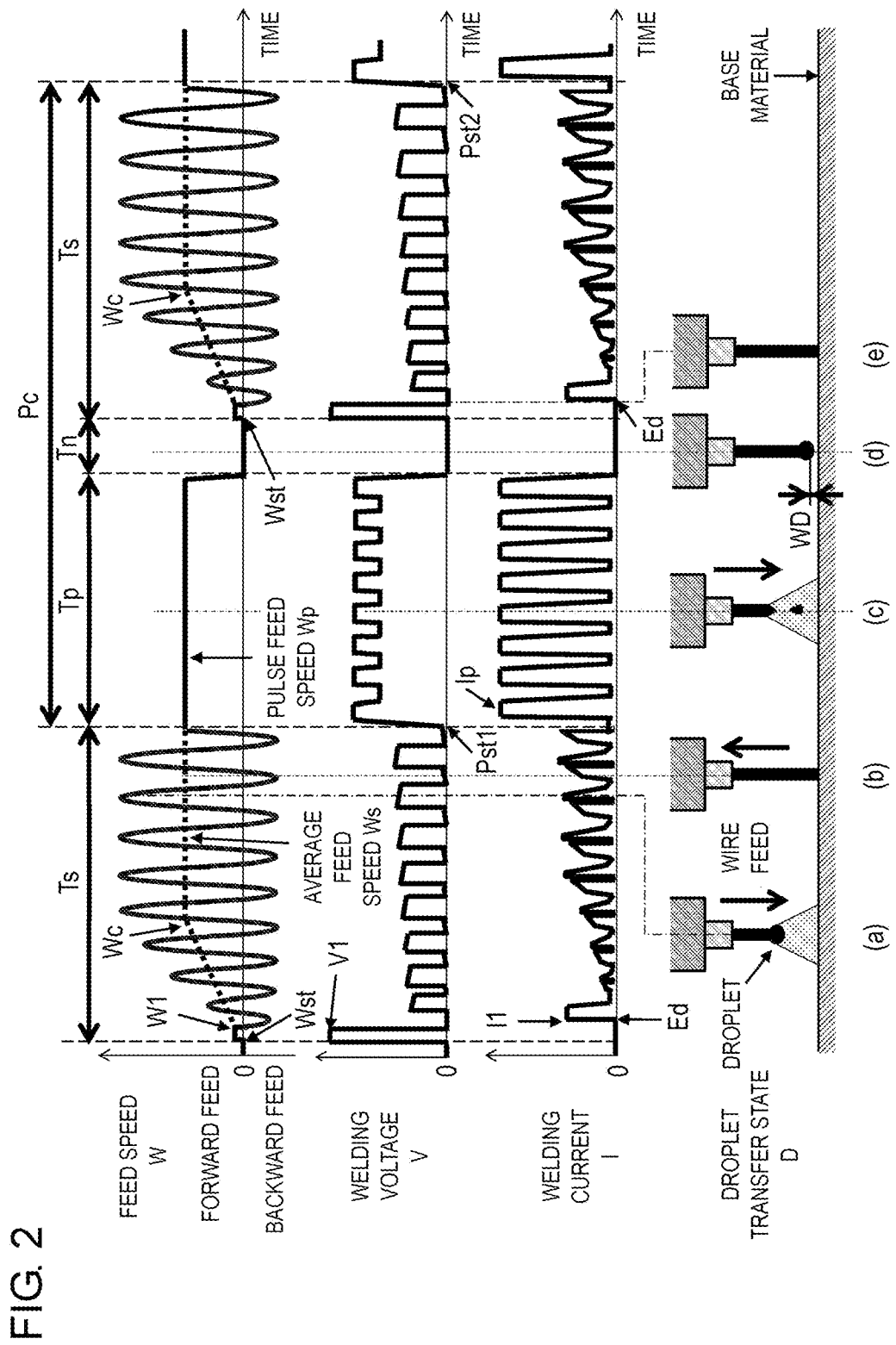
FIG. 2 is a diagram showing various output waveforms at a time of arc welding according to the first exemplary embodiment of the present disclosure.

FIG. 2 is a diagram showing various output waveforms at a time of arc welding according to the present exemplary embodiment. In the present exemplary embodiment, arc welding is performed with repeats of short circuit period T5, pulse welding period Tp, and cooling period Tn. FIG. 2 shows temporal changes of feed speed W, welding voltage V, welding current I, and droplet transfer state D of welding wire leading end.

First, feed of welding wire 18 is started at feed speed W1 from time point Wst when start of welding is instructed. Then, short-circuit welding controller 11 controls a welding output under conditions set by short circuit welding setter 23 from time point Wst when the start of welding is instructed or from time point Ed when occurrence of a short circuit between welding wire 18 for which the start of welding is instructed and base material 17 as a welding target is detected. Arc welding apparatus 16 performs short circuit welding until a lapse of predetermined time Ts preset by short circuit welding setter 23. Next, after the lapse of predetermined time Ts, control switcher 9 switches from the short circuit welding to the pulse welding. Pulse welding controller 12 controls a welding output under conditions set by pulse welding setter 24 from pulse welding start time point Pst (Pst1, Pst2). Arc welding apparatus 16 performs pulse welding with repeats of peak current Ip and base current until a lapse of predetermined time Tp preset by pulse welding setter 24. Then, after the lapse of predetermined time Tp, control switcher 9 switches from the pulse welding to the cooling period. Arc welding apparatus 16 shuts off an output from output controller 10 until a lapse of predetermined time Tn set by cooling period setter 25. This makes it possible to turn the amount of heat input by the arc to zero. Arc welding apparatus 16 forms scaly beads with repeats of short circuit welding period Ts, pulse welding period Tp, and cooling period Tn described above in order as one welding cycle.

As shown in FIG. 2, short circuit welding period Ts is followed by pulse welding period Tp with a large amount of heat input. Pulse welding period Tp is followed by cooling period Tn during which the amount of heat input is zero. This makes it possible to enhance a cooling effect at the welding spot and maximize the difference in the amount of heat input, thereby achieving clearly rippled scaly beads. In cooling period Tn, setting the welding current and the welding voltage to zero makes it possible to set the amount of heat input to zero with highest cooling performance. Setting only the welding current to zero and continuing to apply the welding voltage makes it possible to maintain a state with occurrence of a no-load voltage and smoothly start an arc in next short circuit welding period Ts. A cycle from pulse welding start time point Pst1 of pulse welding period Tp to pulse welding start time point Pst2 of pulse welding period Tp in a next cycle is cycle Pc of pulse welding period. As cycle Pc of pulse welding period is longer, ripples become rougher. As cycle Pc of pulse welding period is shot, ripples become finer.

If no melt pool is formed immediately under the arc at the time of arc occurrence in pulse welding period Tp, the droplets of welding wire 18 are blown off and sputtering is generated at the time of output of peak current Ip of pulse. Thus, short circuit welding period Ts is provided before pulse welding period Tp. Accordingly, a melt pool is formed immediately under the arc at the time of switching from short circuit welding period Ts to pulse welding period Tp, which makes it possible to suppress the occurrence of sputtering due to the pulse current.

At the time of arc start in short circuit welding period Ts, as shown in FIG. 2, the welding voltage is adjusted to a no-load voltage V1 that is higher than the welding voltage during pulse welding period Tp. The feed speed is adjusted to constant feed speed W1 until welding wire 18 causes a short circuit with base material 17 so that power distribution is detected. After the detection of power distribution, welding current I1 is larger than the welding current at the time of short circuit opening in the present welding. Welding current I1 is output for a predetermined period of time. During this period, welding wire 18 is fed backward with predetermined amplitude. After the short circuit opening, welding wire 18 is repeatedly fed forward and backward with the predetermined amplitude and frequency. FIG. 2 shows a case in which a feed waveform is a sign waveform. However, the feed waveform may be any periodic waveform such as a trapezoidal waveform (not shown). The frequency (cycle) may be constant or variable. Feeding at a constant feed speed without predetermined amplitude and frequency is easy to control but sputtering is likely to occur due to electromagnetic pinch force at the time of short circuit opening. Accordingly, welding wire 18 is mechanically fed forward and backward with the predetermined amplitude and frequency. This suppresses the occurrence of sputtering at the time of short circuit opening in short circuit welding period Ts.

FIG. 2 shows a droplet transfer state D at this time on the lowest side. State (a) indicates a droplet transfer state in the arc period of the short circuit arc welding in short circuit welding period Ts in which welding wire 18 is fed forward with generation of an arc. State (b) indicates a droplet transfer state in the short circuit period of short circuit arc welding in short circuit welding period Ts in which droplets at the leading end of the welding wire are transferred to base material 17 and then the wire is fed backward, thereby mechanically facilitating short circuit opening. Next, the feed of welding wire 18 in pulse welding period Tp is performed at a constant feed speed optimum for the welding current set by pulse welding setter 24. The welding current has repeats of peak current and base current. The droplets at the leading end of the welding wire are separated as in state (c). In cooling period Tn, the feed speed of welding wire 18 is stopped as in state (d). At that time, a distance from the leading end of welding wire 18 to base material 17 is designated as WD. After a lapse of cooling period Tn, a next cycle is executed again. As in state (e), welding wire 18 is brought into contact with base material 17 and power distribution is detected, and then next short circuit welding period Ts is started again. In this manner, the arc maintained in short circuit welding period Ts and pulse welding period Tp becomes extinct in cooling period Tn. Since it is necessary to regenerate an arc at the time of switching to next short circuit welding period Ts, sputtering is likely to occur due to electromagnetic pinch force at the time of short circuit opening in the initial stage of arc start. However, in short circuit welding period Ts in the present exemplary embodiment, welding wire 18 is mechanically fed forward and backward, which makes it possible to suppress the occurrence of sputtering at the time of short circuit opening in the initial stage of arc start. That is, welding wire 18 is fed forward and backward in short circuit welding period Ts so that the short circuit is mechanically opened, thereby reducing the occurrence of sputtering due to electromagnetic pinch force.

As shown in FIG. 2, welding current I and feed speed W change from time to time in short circuit welding period Ts. In particular, average feed speed Ws of the feed speed gradually increases to approach feed speed We that is the same as feed speed Wp in pulse welding period Tp.

Performing welding in a cycle of repeating short circuit welding period Ts, pulse welding period Tp, and cooling period Tn in order and adjusting short circuit welding with low heat input, pulse welding with high heat input, and cooling period in which the amount of heat input is zero makes it possible to widely control the amount of heat input to base material 17 and control welding bead shape in a more precise manner.

During short circuit welding period Ts, welding wire 18 is fed with the predetermined amplitude and frequency. However, the feed of welding wire 18 is not limited to this. As described above, for easy management, during short circuit welding period Ts, welding wire 18 may be fed at a constant feed speed.

During pulse welding period Tp, welding wire 18 is fed at a constant feed speed. However, the feed of welding wire 18 is not limited to this. During pulse welding period Tp, the feed speed of welding wire 18 may be changed.

During short circuit welding period Ts, average feed speed Ws is increased to a constant feed speed during pulse welding period Tp. However, the feed speed is not limited to this. Average feed speed Ws at an end of short circuit welding period Ts may be different form the constant feed speed during pulse welding period Tp.

[Arc Welding Procedure]

Figure 3:
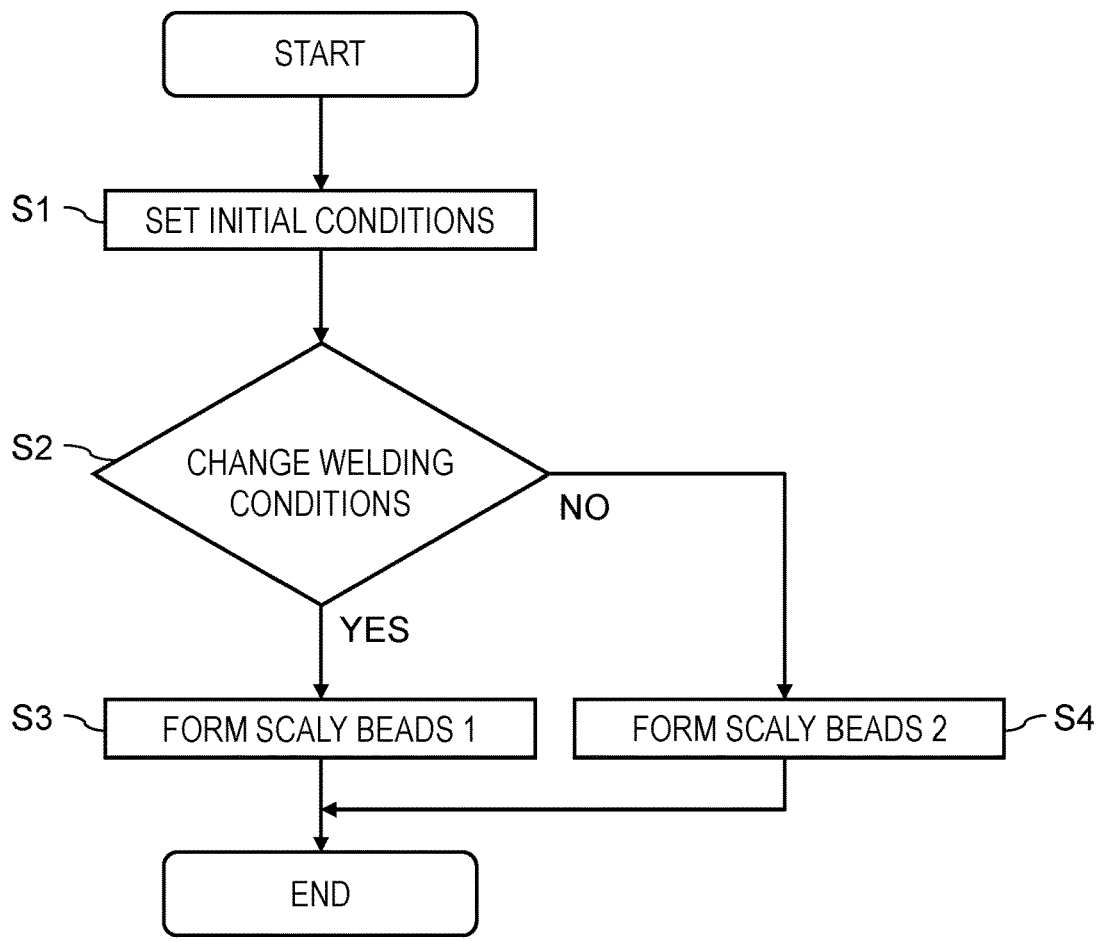
FIG. 3 is a flowchart of an arc welding procedure according to the first exemplary embodiment of the present disclosure.
Figure 4:
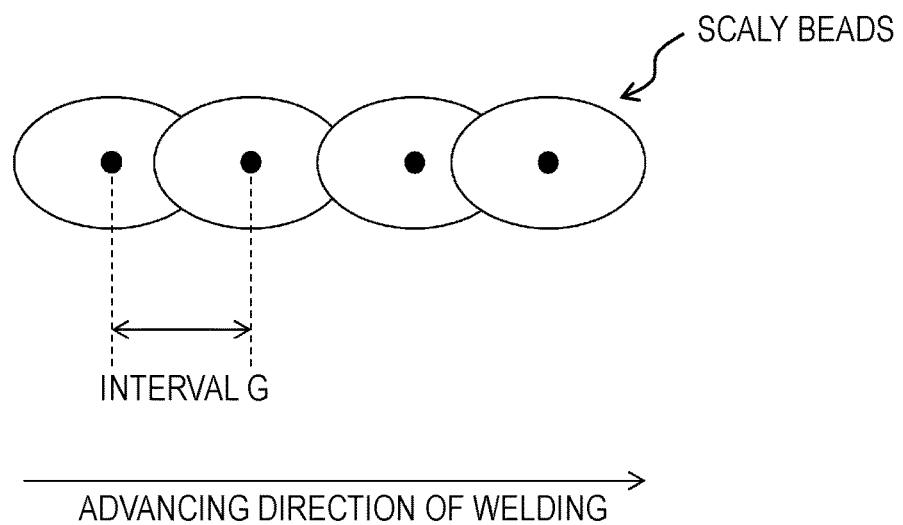
FIG. 4 is a schematic view of a shape of scaly beads.

FIG. 3 is a flowchart of an arc welding procedure according to the present exemplary embodiment, and FIG. 4 is a schematic view of shapes of scaly beads. In the following description, unless otherwise specified, "arc ON period A" corresponds to a sum of short circuit welding period Ts and pulse welding period Tp described above, and "arc OFF period B" corresponds to cooling period Tn described above. That is, arc ON period A is a period during which welding current I flows in welding wire 18, and arc OFF period B is a period during which welding current I does not flow in welding wire 18. In addition, "welding period C" corresponds to a sum of arc ON period A and arc OFF period B. The arc ON period, arc OFF period, and welding period may be called "arc ON time T1", "arc OFF time T3", and "welding time T4", respectively. Welding cycle C matches cycle Pc of the pulse welding period, and welding time T4 corresponds a sum of arc ON time T1 and arc OFF time T3.

First, an arc welding procedure will be described with reference to FIG. 3.

Before arc welding of base material 17, initial conditions are set (step S1). This is an operation of assigning some welding parameters in advance to determine optimum welding conditions in order to satisfy desired finish conditions. In the following description, unless otherwise specified, the "welding parameters" include arc ON period A (arc ON time T1), arc OFF period B (arc OFF time T3), and welding cycle C (welding time T4), which are described above. In addition, the welding parameters include at least welding current I described above, a movement speed of a torch at the time of welding (hereinafter, called welding speed Vw), and interval G of scaly beads (see FIG. 4). The welding parameters may include, for example, welding voltage V, the feed speed of welding wire 18, and a temporal change of the feed speed.

Next, it is determined whether to actually perform arc welding under the foregoing initial conditions or perform arc welding under other conditions. That is, it is determined whether there is necessity to change the welding conditions (step S2). The initial conditions set in step S1 are, for example, conditions under which ripples of scaly beads clearly appear in a case where base materials 17 as plate materials with a plate thickness of 3.0 mm are subjected to lap welding or in a case where a joint of a predetermined shape is welded. However, in a case where the user actually performs arc welding with the use of arc welding apparatus 16, the shape and material of base material 17 as a welding target vary. Thus, in the case of executing arc welding under the initial conditions, a welded place may not be finished as desired. In this case, the welding conditions need to be changed in accordance with the shape and material of base material 17.

Arc welding apparatus 16 may execute a determination process. For example, arc welding apparatus 16 includes a storage unit and a processor. The storage unit saves judgment criteria for the determination process. The judgment criteria define characteristics of the base material and a mode of welding with which the ripples of scaly beads clearly appear, for example, in the case of performing arc welding under the initial conditions. The characteristics of the base material include, for example, thickness, shape, and material of the base material. The mode of welding includes information of lap welding, joint welding, and others. The processor acquires a data set of the characteristics of the base material to be welded and the mode of welding, and determines whether the data set satisfies the judgment criteria stored in the storage unit. The processor may notify the user of a determination result by display.

When the determination is affirmative, that is, it is determined that the welding conditions need to be changed in step S2, arc welding is performed under welding conditions different from the initial conditions to form scaly beads on base material 17 (step S3). On the other hand, when the determination is negative, that is, it is not determined that the welding conditions need to be changed in step S2, the welding conditions are not changed and the arc welding is performed under the initial conditions to form scaly beads on base material 17 (step S4).

After the setting of the initial conditions in step S1 and the determination on the need to change the welding conditions in step S2, the setting of the welding conditions under which step S3 is executed and the setting of judgment criteria for changing the welding conditions in step 2 in a case where arc welding apparatus 16 performs a determination process on change of the welding conditions in step S2 are made by inputting values input from an input device not shown, for example, a keyboard or a teaching pendant (not shown) into output controller 10 or a storage unit (not shown) connectable to output controller 10 via welding condition setter 22.

The scaly beads formed in this manner are continuously arranged with predetermined interval G on base material 17, in general, along an advancing direction of welding as shown in FIG. 4. A design of outer appearance of the scaly beads is judged depending on whether interval G is constant, on whether individual beads are not too separated, or on whether ripples of a scale pattern are clear.

[About a Welding Condition Changing Method]

A method for actually changing the welding conditions will be described taking a case of changing interval G of the beads as an example. In general, in order to unify the outer appearance of the scaly beads, in other words, in order to improve the design of outer appearance of the scaly beads, it is preferable to keep interval G of the beads constant.

On the other hand, the interval may be changed differently from the interval set as the initial condition depending on the shape of base material 17 as a welding target or the user's specifications. In this case, the scaly beads may not be made in a desired finish shape by merely changing interval G. For example, increasing welding speed Vw along with an increase in interval G causes the ripples to be separated from each other, thereby deteriorating the design of outer appearance of the beads. In addition, increasing welding speed Vw reduces heat input into the welding spot. This may cause a welding defect such as insufficient melting to degrade the quality of welding at the welding spot. In contrast, decreasing welding speed Vw along with a reduction in interval G causes the ripples to come close to each other to provide excessive heat input so that the ripples disappear to deteriorate the design of outer appearance of the beads. In addition, the increase in heat input causes a welding defect such as burn-through to degrade the quality of welding at the welding spot.

As described above, at the time of change of interval G, it is difficult to perform arc welding with favorable quality of welding while keeping the design of outer appearance of the beads by merely changing welding speed Vw. To obtain desired interval G, it is necessary to change welding speed Vw and change arc ON time T1 and arc OFF time T3. For example, when welding speed Vw is increased, arc ON time T1 and arc OFF time T3 need to be shortened. In contrast, when welding speed Vw is decreased, arc ON time T1 and arc OFF time T3 need to be lengthened. However, arbitrarily changing arc ON time T1 and arc OFF time T3 causes a change in the amount of heat input to the welding spot. Thus, in order to ensure desired quality of welding, it is necessary to change welding current I and welding voltage V. As described above, in order to perform arc welding with favorable quality of welding while keeping the design of outer appearance of the beads and changing interval G, it is necessary to adjust at least six welding parameters including welding current I, welding voltage V, welding speed Vw, interval G, arc ON time T1, and arc OFF time T3 to appropriate values each time, which would be a very difficult operation.

Thus, in the present exemplary embodiment, keeping welding speed Vw at the initial condition and keeping a ratio of arc ON time T1 to welding time T4 and a ratio of arc OFF time T3 to welding time T4 at the initial conditions make it possible to perform arc welding with favorable quality of welding while keeping the design of outer appearance of the beads and changing interval G to a desired value.

First, the interval is changed while the ratio of arc ON time T1 to welding time T4 and the ratio of arc OFF time T3 to welding time T4 are kept at the initial conditions. As described above, a relationship shown in equation (1) holds among arc ON time T1, arc OFF time T3, and welding time T4 as follows.

$$T4 = T1 + T3 \quad (1)$$

On the other hand, a relationship shown in equation (2) holds among interval G (mm), welding speed Vw (m/min), and welding time T4 (msec) as follows.

$$G = Vw \times T4 / 60 \quad (2)$$

In addition, when the ratio of arc ON time T1 to welding time T4 is designated as arc ON ratio Ron (%) and the ratio of arc OFF time T3 to welding time T4 is designated as arc OFF rate Roff (%), respective relationships shown in equations (3) and (4) hold between these rates as follows.

$$Ron = 100 \times T1 / T4 = 100 \times T1 / (T1 + T3) \quad (3)$$

$$Roff = 100 \times T3 / T4 = 100 \times T3 / (T1 + T3) \quad (4)$$

A case of changing interval G to G1 (<G) will be discussed. Since welding speed Vw is made constant, welding time T4 needs to be shortened in accordance with a ratio G1/G as apparent from equation (2). On the other hand, since arc ON rate Ron and arc OFF rate Roff are kept at the initial conditions, arc ON time T1 and arc OFF time T3 are set to be shorter in accordance with the ratio G1/G.

Table 1 shows values of welding parameters with a change of interval G from 2.65 mm to 2.00 mm.

TABLE 1

| Condition | Welding parameter | Welding condition | |
| --- | --- | --- | --- |
| | | Initial condition | After change |
| Change of G | Arc ON time T1 (msec) | 360 | 272 |
| | Arc OFF time T3 (msec) | 170 | 128 |
| | Welding time T4 (msec) | 530 | 400 |
| | Welding speed Vw (m/min) | 0.30 | 0.30 |

TABLE 1-continued

| Condition | Welding parameter | Welding condition | |
| --- | --- | --- | --- |
| | | Initial condition | After change |
| | Interval G (mm) | 2.65 | 2.00 |
| | Arc ON rate Ron (%) | 67.9 | 67.9 |
| | Arc OFF rate Roff (%) | 32.1 | 32.1 |

As apparent from Table 1, arc ON time T1 is changed to 272 msec that is a value obtained by multiplying an initial value of 360 msec by an interval G change ratio of 0.755 (□2/2.65). Arc OFF time T3 is changed to 128 msec that is a value obtained by multiplying an initial value of 170 msec by the interval G change ratio of 0.755.

Next, a method for changing the welding conditions will be described taking a case of improving the design of outer appearance of the beads as an example. As described above, in order to improve the design of outer appearance of the beads, it is necessary to make clear the ripples of the scale pattern. On the other hand, when the arc welding conditions are not appropriate, pits may be generated in the scaly beads. The pits are air bubbles that are formed due to a gas such as hydrogen taken from a welding atmosphere with a large temperature change in the same place during arc welding. The presence of a large number of pits would deteriorate the outer appearance of the beads.

To make clear the ripples of the scale pattern and suppress the occurrence of pits in the scaly beads, arc ON rate Ron and arc OFF rate Roff may not be necessarily held at the initial conditions. It is sufficiently possible to make the ripples clear and suppress the occurrence of pits by making individual fine adjustments to arc ON time T1 and arc OFF time T3.

A case of making clear the ripples of the scale pattern will be discussed. In order to attain this state, it is necessary to keep low the amount of heat input at the welding spot. Therefore, arc OFF time T3 may be lengthened or arc ON time T1 may be shortened. Welding speed Vw is kept at the initial condition in the same manner as described above.

Table 2 shows values of the welding parameters with a change of arc ON time T1 or arc OFF time T3.

TABLE 2

| Condition | Welding parameter | Welding condition | |
| --- | --- | --- | --- |
| | | Initial condition | After change |
| Change of T1 | Arc ON time T1 (msec) | 360 | 330 |
| | Arc OFF time T3 (msec) | 170 | 170 |
| | Welding time T4 (msec) | 530 | 500 |
| | Welding speed Vw (m/min) | 0.30 | 0.30 |
| | Interval G (mm) | 2.65 | 2.50 |
| | Arc ON rate Ron (%) | 67.9 | 66.0 |
| | Arc OFF rate Roff (%) | 32.1 | 34.0 |
| Change of T3 | Arc ON time T1 (msec) | 360 | 360 |
| | Arc OFF time T3 (msec) | 170 | 240 |
| | Welding time T4 (msec) | 530 | 600 |

TABLE 2-continued

| Condition | Welding parameter | Welding condition | |
|---|---|---|---|
| | | Initial condition | After change |
| | Welding speed Vw (m/min) | 0.30 | 0.30 |
| | Interval G (mm) | 2.65 | 3.00 |
| | Arc ON rate Ron (%) | 67.9 | 60.0 |
| | Arc OFF rate Roff (%) | 32.1 | 40.0 |

As can be seen from Table 2, in a case where arc ON time T1 is changed from the initial value of 360 msec to 330 msec, arc OFF time T3 is not changed. Therefore, according to the shortening of arc ON time T1, welding time T4 becomes shorter and interval G also becomes smaller. In a case where arc OFF time T3 is changed from the initial value of 170 msec to 240 msec, arc ON time T1 is not changed. Therefore, according to the extension of arc OFF time T3, welding time T4 becomes longer and interval G also becomes larger.

On the other hand, in order to suppress the occurrence of pits, it is necessary to adjust a heat input balance at the welding spot. Specifically, since the pits tend to increase as arc OFF time T3 becomes longer, arc OFF time T3 is adjusted to be shorter.

Advantageous Effects

As described above, the arc welding control method in the present exemplary embodiment is an arc welding control method for forming a plurality of scaly beads continuously arranged at predetermined interval G on base material 17 in welding cycle C (welding time T4) that is the sum of arc ON period A (arc ON time T) during which welding current I flows to welding wire 18 and arc OFF period B (arc OFF time T3) that is provided after arc ON period A and during which welding current I does not flow to welding wire 18. The arc welding control method in the present exemplary embodiment includes: an initial condition setting step of setting a welding condition for arc-welding base material 17; and a scaly bead formation step of forming a plurality of scaly beads in a predetermined welding section of base material 17 while moving welding wire 18 in the predetermined welding section of base material 17 at predetermined welding speed Vw. The welding condition is formed by a plurality of welding parameters. The welding parameters include at least arc ON period A, arc OFF period B, welding cycle C, welding current I, welding speed Vw, and interval G. The arc welding control method in the present exemplary embodiment further includes: a welding condition change step of, before the scaly bead formation step, changing welding cycle C and interval G such that welding speed Vw is made constant and the ratio of arc ON period A to welding cycle C (=arc ON rate Ron) and the ratio of arc OFF period B to welding cycle C (=arc OFF rate Roff) are maintained.

According to the control method of the present exemplary embodiment, it is possible to perform arc welding with favorable quality of welding while keeping the design of outer appearance of the beads and changing interval G to a desired value. In particular, changing interval G while keeping welding speed Vw to match the initial condition and keeping constant arc ON rate Ron and arc OFF rate Roff makes it possible to match a heat input balance at the welding spot with the initial condition. Accordingly, the quality of welding can be favorably kept without excessive convex shapes of the beads or the occurrence of burn-through.

In the welding condition change step, at least one of arc ON period A and arc OFF period B may be changed so that at least one of welding cycle C and interval G may be changed accordingly. Arc OFF period B is preferably lengthened to improve the design of outer appearance of the scaly beads, or arc ON period A may be shortened.

Changing the welding condition in this manner eliminates the need for complicated adjustments between the plurality of welding parameters and improves the design of outer appearance of scaly beads, specifically, makes clear the ripples of the scale pattern.

In the welding condition change step, arc OFF period B is preferably shortened to decrease the number of pits occurring in the scaly beads.

Changing the welding condition in this manner eliminates the complicated adjustment between the plurality of welding parameters and reduces the number of pits occurring in the scaly beads.

Taken together, the welding condition change step in the present exemplary embodiment is a step of, before the scaly bead formation step, determining whether there is necessity to change the initial condition based on a predetermined finish condition for the scaly beads, and when a determination result is affirmative, changing at least one of the plurality of welding parameters so as to satisfy the predetermined finish condition. Defining the welding condition change step in this manner eliminates the complicated adjustment between the plurality of welding parameters and makes the outer appearance of the scaly beads in a desired finish shape. In addition, it is possible to favorably keep quality of welding at a welding spot.

Second Exemplary Embodiment

Figure 5:
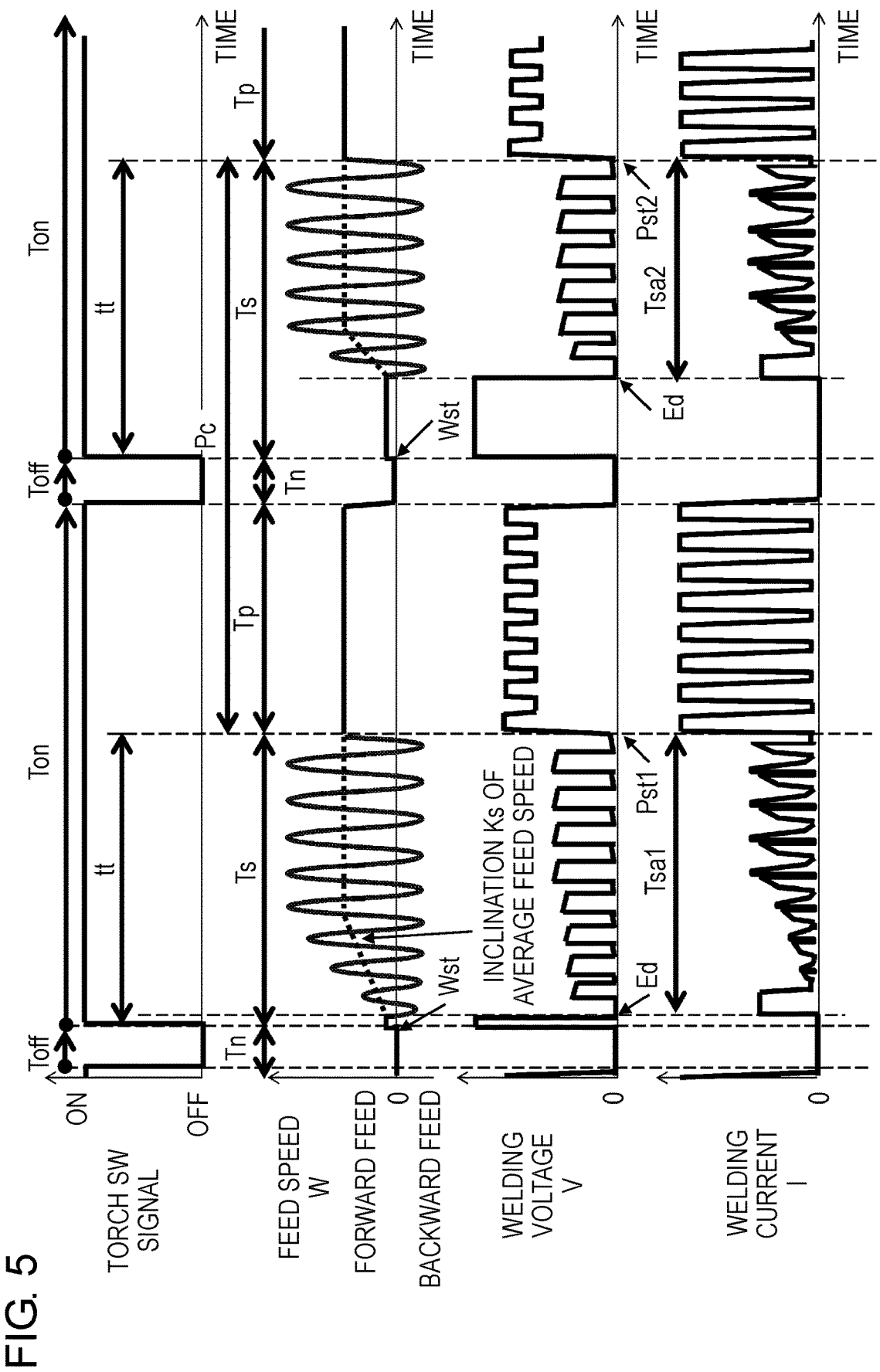
FIG. 5 is a diagram showing various output waveforms at a time of arc welding according to a second exemplary embodiment of the present disclosure.

FIG. 5 shows various output waveforms at the time of arc welding according to the present exemplary embodiment, and the waveforms correspond to indications in FIG. 2. In the present exemplary embodiment, the same components as described in the first exemplary embodiment are denoted by the same reference marks, and detailed description of such components is omitted.

The method in the present exemplary embodiment is different from the method in the first exemplary embodiment in that, in order to make uniform the ripples of the scaly beads, after a lapse of predetermined time tt since a previous torch SW signal is turned on, switching takes place from short circuit period Ts to pulse welding period Tp.

If distance WD from the leading end of welding wire 18 to base material 17 varies, uneven scaly beads will be formed. Thus, as shown in FIG. 5, a time after the torch SW signal is turned on is measured, and after the lapse of predetermined time tt, switching takes place from short circuit welding to pulse welding, and then after a lapse of pulse welding period Tp, the torch SW signal is turned off. Then, a time after the turning off of the torch SW signal is measured, and after a lapse of predetermined time Tn, the torch SW signal is turned on. If distance WD between the leading end of welding wire 18 and base material 17 varies, there will occur fluctuations in a time from feed start time point Wst of welding wire 18 to current detection time point Ed when the occurrence of a short circuit with base material 17 is detected. However, short circuit period Ts from feed start time point Wst of welding wire 18 to pulse welding start time point Pst1, Pst2 is always constant. Therefore, cycle Pc of the pulse welding period, in other words, welding cycle C can be made always constant, which makes it possible to form the scaly beads with even ripples. Measuring and switching the ON/OFF times of the torch SW signal makes it possible to set cooling period Tn and short circuit welding period Ts, thereby achieving easy management.

Also in the welding method in the present exemplary embodiment, changing the welding conditions in the same manner as in the first exemplary embodiment eliminates the need for complicated adjustment between the plurality of welding parameters and make the outer appearance of the scaly beads in a desired finish shape. In addition, it is possible to favorably keep quality of welding at a welding spot.

Third Exemplary Embodiment

Figure 6:
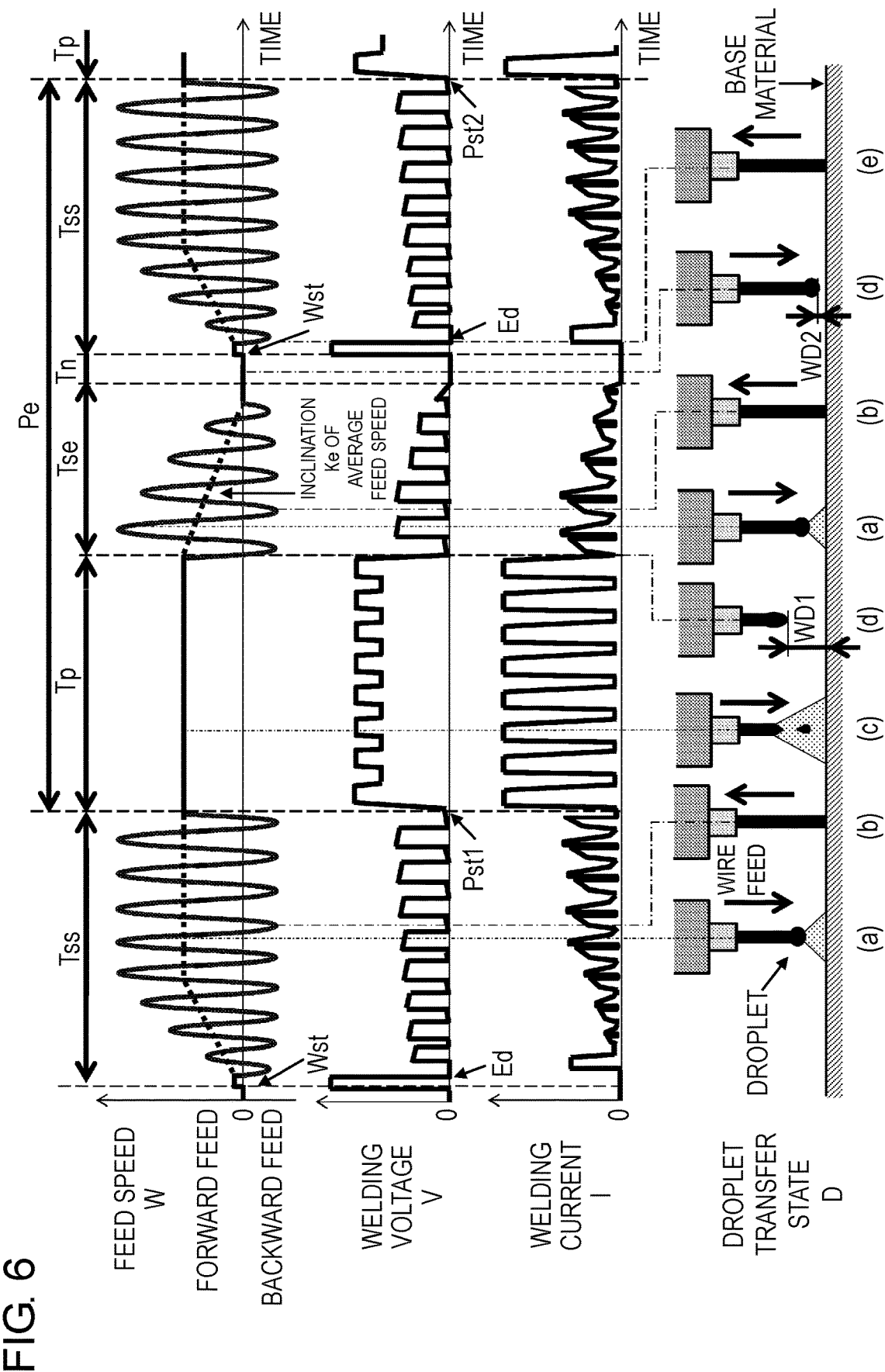
FIG. 6 is a diagram showing various output waveforms at a time of arc welding according to a third exemplary embodiment of the present disclosure.

FIG. 6 shows various output waveforms at the time of arc welding according to the present exemplary embodiment, and the waveforms correspond to indications in FIGS. 2 and 5. In the present exemplary embodiment, the same components as described in the first and second exemplary embodiments are denoted by the same reference marks, and detailed description of such components is omitted.

The method in the present exemplary embodiment is different from the methods in the first and second exemplary embodiments in that second short circuit welding period Tse is provided between pulse welding period Tp and cooling period Tn. Specifically, welding is performed by repeating first short circuit welding period Tss, pulse welding period Tp, second short circuit welding period Tse, and cooling period Tn in order as one welding cycle.

The short circuit welding is shorter in arc length than the pulse welding and makes it possible to shorten distance WD between the leading end of welding wire 18 and base material 17 at the end of welding and reduce variations in the length of cooling period Tn. As shown in state (d) of droplet transfer state D in FIG. 6, the distance between the leading end of welding wire 18 and base material 17 at the end of pulse welding period Tp is distance WD1. The distance between the leading end of welding wire 18 and base material 17 after the end of second short circuit welding period Tse is distance WD2. Distance WD2 is shorter than distance WD1. Accordingly, the time from feed start time point Wst of welding wire 18 to current detection time point Ed can be decreased. This makes it possible to decrease the variations in cooling period Tn and form even scaly beads while making constant cycle Pc of the pulse welding period. At this time, in second short circuit welding period Tse, an average feed speed of welding wire 18 is gradually decreased with inclination Ke. After detection of a final arc, an output of welding current I is shut off. In second short circuit welding period Tse, the average feed speed of welding wire 18 is decreased with inclination Ke such that, with the occurrence of a short circuit and an arc as one cycle, second short circuit welding period Tse is ended in about first to fifth cycles. If second short circuit welding period Tse is too long, the amount of heat input to the welding spot will increase to make unclear the ripples of the scaly beads.

As described above, repeating first short circuit welding period Tss, pulse welding period Tp, second short circuit welding period Tse, and cooling period Tn makes it possible to make constant cycle Pc of the pulse welding period and form the scaly beads with clear and even ripples.

A time length of second short circuit welding period Tse (hereinafter, called end active time T2) may be adjusted in accordance with a time length of first short circuit welding period Tss and/or end active time T2 such that cycle Pc of the pulse welding period becomes constant more strictly. Inclination Ke of the average feed speed may be changed in accordance with end active time T2. End active time T2 is included in arc ON time T1. When the time length of first short circuit welding period Tss is designated as T11 and a time length of pulse welding period Tp is designated as T12, a relationship between these time lengths is expressed by equation (5) as follows.

$$T1 = T11 + T12 + T2 \quad (5)$$

End active time T2 is the time length of second short circuit welding period Tse as described above. Second short circuit welding period Tse is a period of a course of transition from pulse welding period Tp to cooling period Tn. The feed speed of wire 18 is constant in pulse welding period Tp and is zero in cooling period Tn. In second short circuit welding period Tse, the feed of welding wire 18 is alternately repeated forward and backward. The average feed speed of welding wire 18 is attenuated in second short circuit welding period Tse. Setting a predetermined value to end active time T2 makes it possible to gradually reduce the amount of heat input to base material 17.

In the present exemplary embodiment, in the end active period, the wire feed speed is attenuated. Alternatively, the wire feed speed may be attenuated after the end of the active operation that is performed with the average value of the wire feed speed made constant while the feed of the welding wire is alternately repeated forward and backward.

In the welding method of the present exemplary embodiment, changing the welding conditions in the same manner as in the first exemplary embodiment eliminates the need for complicated adjustments between the plurality of welding parameters and make the outer appearance of the scaly beads in a desired finish shape. In addition, it is possible to favorably keep quality of welding at a welding spot. In particular, lengthening end active time T2 makes it possible to adjust a heat input balance at the welding spot and decrease the number of pits occurring in the scaly beads, thereby improving the design of outer appearance of the scaly beads.

Fourth Exemplary Embodiment

When base material 17 is subjected to arc welding, the amount of heat input to base material 17 may vary depending on a position of base material 17. In addition, as the arc welding proceeds, the amount of heat input to base material 17 at a predetermined position may change with time. For example, the amount of heat input to base material 17 greatly differs between a welding start point and a welding spot separated by a predetermined distance from this start point in a predetermined welding section. This is because, at the welding start point, an arc just starts to be generated so that insufficient heat is input to base material 17. In addition, the amount of heat input to base material 17 changes also when a plate thickness of base material 17 changes in the welding section. This change in the amount of heat input may make the quality of welding unstable and greatly deteriorate the design of outer appearance of the scaly beads. On the other hand, this spatial change or temporal change in the amount of heat input cannot be handled by merely changing the welding conditions from the initial conditions in step S2 shown in FIG. 4.

Thus, in the present exemplary embodiment, the foregoing issues can be solved by changing the welding conditions in such a manner as to change at least one of the welding parameters continuously or stepwise, in other words, incline and slope a change waveform of the welding parameter with respect to a teaching position and a lapse time (hereinafter, also describing this as sloping the welding parameter).

Figure 7A:
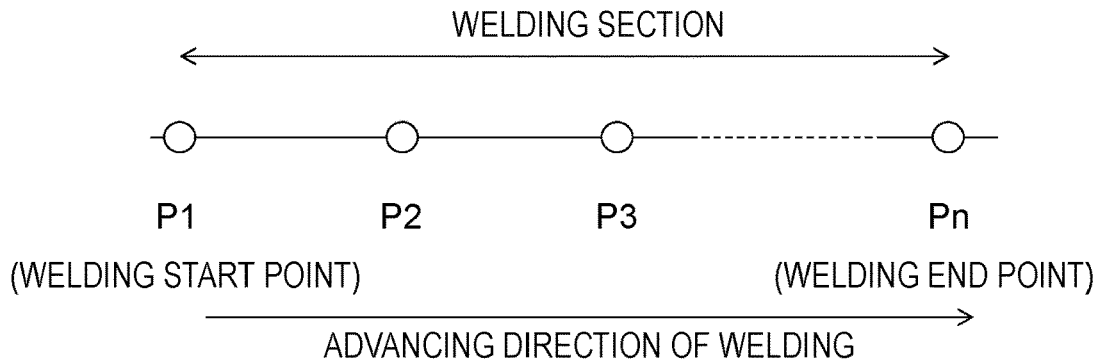
FIG. 7A is a conceptual diagram showing teaching point positions in a welding section according to a fourth exemplary embodiment of the present disclosure.
Figure 7B:
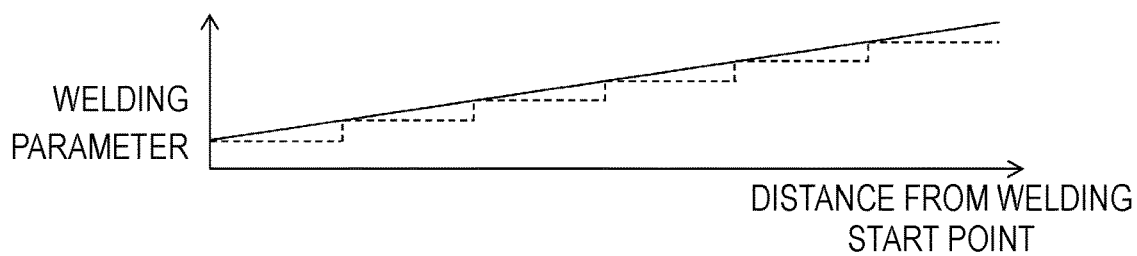
FIG. 7B is a diagram showing a relationship between a distance from a welding start point and a welding parameter.
Figure 7C:
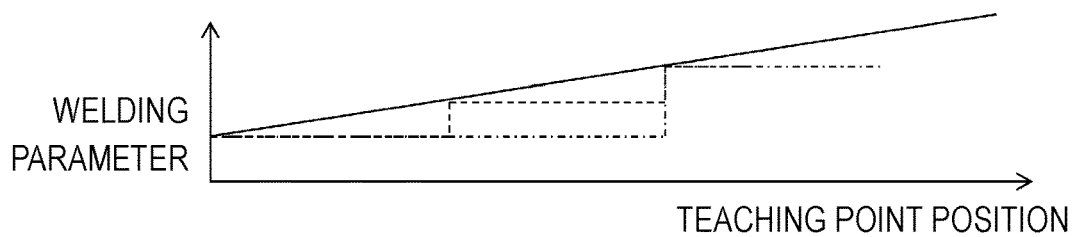
FIG. 7C is a diagram showing a relationship between a teaching point position and a welding parameter.
Figure 7D:
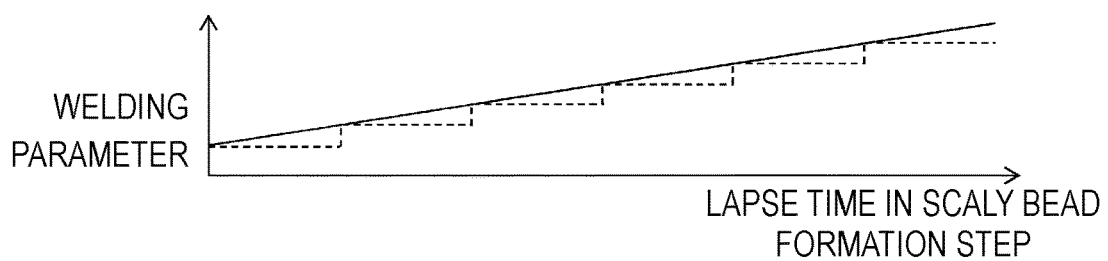
FIG. 7D is a diagram showing a relationship between a lapse time and a welding parameter in a scaly bead formation step.

FIG. 7A is a conceptual diagram of teaching point positions in a welding section according to the present exemplary embodiment, FIG. 7B is a diagram showing a relationship between a distance from a welding start point and a welding parameter, FIG. 7C is a diagram showing a relationship between a teaching point position and a welding parameter, and FIG. 7D is a diagram showing a relationship between a lapse time and a welding parameter in the scaly bead formation step.

Which of the welding parameters is to be changed continuously or stepwise can be selected in various manners according to the actual conditions for arc welding.

As shown in FIG. 7A, in a predetermined welding section, a plurality of teaching points is set at a time of teaching before the welding. At the actual arc welding, the torch is moved from welding start point P1 along an advancing direction at predetermined welding speed Vw. Concurrently with the start of movement of the torch, arc welding is started to weld base material 17 up to welding end point Pn.

In this case, for example, the welding parameter may be changed continuously or stepwise according to a distance from welding start point P1 in the welding section as shown in FIG. 7B. Although not shown, in a case of changing the welding parameter stepwise, an amount of change may vary in a middle of the welding section or a cycle of change may vary in the middle of the welding section. In addition, as shown in FIG. 7C, the welding parameter may be changed continuously or stepwise according to the teaching point positions. In a case of changing the welding parameter stepwise, the welding parameter may be changed continuously or stepwise at each of the teaching point positions as shown by a broken line in FIG. 7C or the welding parameter may be changed continuously or stepwise at two or more each of the teaching points as shown by a dashed-dotted line in FIG. 7C. Although not shown, in a case of changing the welding parameter stepwise, an amount of change may vary in a middle of the welding section or a cycle of change may vary in the middle of the welding section. Further, as shown in FIG. 7D, the welding parameter may be changed continuously or stepwise according to a lapse time from the welding start point in the scaly bead formation step. Although not shown, in a case of changing the welding parameter stepwise, an amount of change may vary in a middle of the welding section or a cycle of change may vary in the middle of the welding section.

In this manner, changing at least one of the plurality of welding parameters continuously or stepwise according to any one of the lapse time, the distance from the welding start point in the welding section, or the welding teaching point position in the scaly bead formation step makes it possible to change the rate of heat input, in particular, in a case where the amount of heat input to base material 17 changes. Accordingly, it is possible to appropriately adjust the amount of heat input to base material 17 and form the scaly beads in a desired finish shape in a predetermined welding section.

As the welding parameter for controlling the amount of heat input, one or more of welding current I, welding voltage V, arc ON time T1, end active time T2, and arc OFF time T3 can be selected according to, for example, the state of base material 17. Hereinafter, a plurality of specific examples will be described. The following examples are based on the configuration in the third exemplary embodiment, that is, the provision of second short circuit welding period Tse. Also in the present exemplary embodiment, welding speed Vw is constant in the welding section.

Table 3 shows the values of welding parameters in a case where one or more of the welding parameters are sloped.

TABLE 3

| | | Leading end position of welding wire 18 in welding section | | |
|---|---|---|---|---|
| Welding condition | Welding parameter | P1 (=welding start point) | P2(≠P1) | Note |
| A | Arc ON time T1 (msec) | 500 | 300 | Moving time of welding wire from P1 to P2: 2 sec |
| | Arc OFF time T3 (msec) | 30 | 200 | |
| | Welding current I (A) | 110 | 110 | |
| B | Arc ON time T1 (msec) | 520 | 360 | P1-P2 distance: 12 mm |
| | Arc OFF time T3 (msec) | 10 | 170 | |
| | Welding current I (A) | 130 | 110 | |
| C | Arc ON time T1 (msec) | 360 | 360 | P1 is point where plate thickness of base material 17 starts to change P2 is point where the change of the plate thickness ends |
| | Arc OFF time T3 (msec) | 170 | 170 | |
| | Welding current I (A) | 90 | 110 | |

TABLE 3-continued

| Welding condition | Welding parameter | Leading end position of welding wire 18 in welding section | | Note |
| --- | --- | --- | --- | --- |
| | | P1 (=welding start point) | P2(≠P1) | |
| D | Arc ON time T1 (msec) | 360 | 360 | |
| | Arc OFF time T3 (msec) | 170 | 170 | |
| | Welding current I (A) | 110 | 100 | |
| E | Arc ON time T1 (msec) | 360 | 360 | P1-P2 distance: 15 mm |
| | Arc OFF time T3 (msec) | 170 | 170 | |
| | Welding current I (A) | 90 | 110 | |

Condition A is an example of welding condition for solving a lack of heat input near welding start point P1. In the event of the lack of heat input, the beads may have an excessive convex shape or overlap together to make unclear the ripples of the scale pattern. In this example, arc ON time T1 and arc OFF time T3 are sloped with respect to the lapse time in the scaly bead formation step. For example, the welding condition is changed such that a new slop condition is taken at each sampling time of 100 msec from the welding start time point.

For example, near welding start point P1, arc ON time T1 is set to 500 msec and arc OFF time T3 is set to 30 msec to increase the amount of heat input to base material 17. From this time point, arc ON time T1 and arc OFF time T3 are changed stepwise at each 100 msec so that, two seconds later, arc ON time T1 becomes 300 msec and arc OFF time T3 becomes 200 msec.

Condition B is another example of welding condition for solving a lack of heat input near welding start point P1. In this example, near welding start point P1, arc ON time T1 is lengthened and arc OFF time T3 is shortened. As welding proceeds from welding start point P1 by a predetermined distance (12 mm), arc ON time T1 is shortened and arc OFF time T3 is lengthened to approach their respective initial conditions. In addition, as welding proceeds from welding start point P1 by the predetermined distance (12 mm), welding current I is decreased to approach the initial condition.

Changing welding conditions as conditions A and B makes it possible to solve insufficient fitting of the beads near welding start point P1 and obtain sufficient penetration of base material 17 from welding start point P1.

Condition C is an example of welding condition in a case where heat capacity of base material 17 changes due to a change of the plate thickness of base material 17 (see FIG. 9) or a change of the shape of base material 17 in the welding section. In this example, base material 17 is shaped such that the plate thickness is smallest at point P1, then increases along the advancing direction of welding, and then becomes largest at point P2. To weld base material 17 from point P1 to point P2, welding current I is increased continuously or stepwise.

Changing the welding condition in this manner makes it possible to compensate for a change in the heat capacity of base material 17 in the welding section and obtain a desired finish shape at the welding spot. In addition, it is possible to favorably keep quality of welding.

Next, a temperature change of base material 17 at the time of arc welding will be discussed. A temperature of base material 17 rises due to heat input during arc welding, but the beads may become deformed due to this temperature rise. Condition D is an example of welding condition for solving this problem. In this example, welding current I is decreased continuously or stepwise according to a distance from welding start point P1. Changing the welding condition in this manner makes it possible to suppress the deformation of the beads by a temperature rise of base material 17 along with the advancement of welding.

In a case where the shape of base material 17 as a welding target changes in the welding section, performing welding under constant conditions may disallow obtainment of a desired finish shape or deteriorate the quality of welding.

Figure 8:
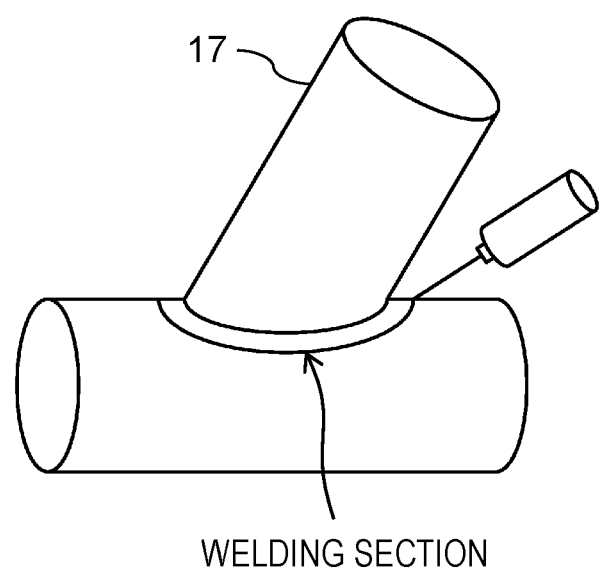
FIG. 8 is a schematic diagram showing an example of shape of a base material according to a fourth exemplary embodiment of the present disclosure.

FIG. 8 is a schematic diagram showing an example of shape of the base material according to the present exemplary embodiment. Base material 17 is a saddle welded body. AT-shaped joint part as the welding section continuously changes in shape. Condition E is an example of a condition for welding the joint pat of base material 17 with the shape shown in FIG. 8. Welding current I is increased continuously or stepwise as welding proceeds from welding start point P1 by a predetermined distance (15 mm). Changing the welding condition in this manner makes it possible to obtain a desired finish shape of base material 17 in which the shape of the welding section changes. In addition, it is possible to favorably keep quality of welding. As shown in condition E, when the welding parameter is sloped in the section from welding start point P1 by a predetermined distance, even if there is a plurality of teaching points in the section, a change rate of the slop or other factors does not steeply change between before and after the teaching points.

As described above, in a case where the shape changes continuously, a number of the teaching points increases. However, sloping the welding parameter continuously or stepwise regardless of the teaching points makes it possible to implement welding of outer appearance of the beads that are aesthetically lined without disorder under no influence of the teaching points.

Figure 9:
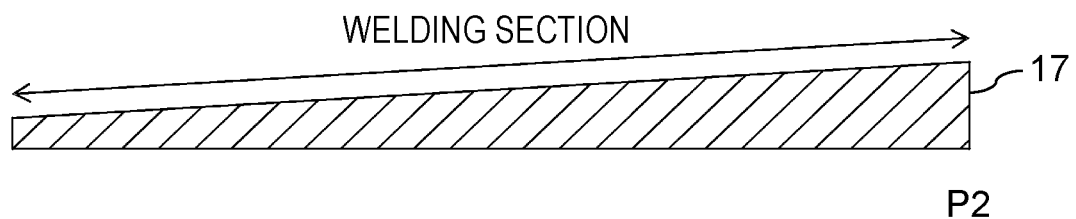
FIG. 9 is a schematic cross-sectional diagram showing another example of shape of the base material.

Next, countermeasures against the occurrence of pits in the scaly beads will be discussed. FIG. 9 is a schematic cross-sectional view of another base material according to the present exemplary embodiment in which a plate thickness of base material 17 simply increases from welding start point P1 to end point P2 in a welding section. When base material 17 of this shape is subjected to arc welding, even if the initial condition for point P1 with a small plate thickness is optimized, a heat input balance becomes disrupted at point P2 with a large plate thickness to make pits likely to occur. Thus, sloping arc ON time T1, end active time T2, and arc OFF time T3 as appropriate makes it possible to suppress the occurrence of pits.

Table 4 shows values of welding parameters in a case where two or more of the foregoing three welding parameters are sloped.

TABLE 4

| Welding condition | Welding parameter | Leading end position of welding wire 18 in welding section | | Note |
|---|---|---|---|---|
| | | P1 (=welding start point) | P2(≠P1) | |
| F | Arc ON time T1 (msec) | 360 | 360 | Plate thickness of base material 17 is small at P1 and is large at P2 |
| | End active time T2 (msec) | 2 | 60 | |
| | Arc OFF time T3 (msec) | 170 | 130 | |
| | Welding current I (A) | 90 | 110 | |
| G | Arc ON time T1 (msec) | 360 | 340 | Plate thickness of base material 17 is small at P1 and is large at P2 |
| | End active time T2 (msec) | 2 | 60 | |
| | Arc OFF time T3 (msec) | 170 | 130 | |
| | Welding current I (A) | 90 | 110 | |

Condition F is an example of welding condition for suppressing the occurrence of pits. As described above, lengthening end active time T2 makes it possible to decrease a number of pits that could occur in the scaly beads. However, this reduces the amount of heat input to base material 17. Thus, arc OFF time T3 is shortened a send active time T2 is lengthened, thereby maintaining a heat input balance in the welding section shown in FIG. 9. Since base material 17 is subjected to short circuit welding during end active time T2, heat input to base material 17 is not zero for this period. Accordingly, shortening arc OFF time T3 by a time equivalent to an extension of end active time T2 makes heat input to base material 17 larger than being preset. Therefore, in this example, arc OFF time T3 is shortened by an amount of time shorter than the extension of end active time T2. However, since welding speed Vw is constant, interval G changes to gradually become longer in the welding section.

Condition G is another example of welding condition for suppressing the occurrence of pits. Under condition F, arc ON time T1 is also sloped for suppressing a change of interval G.

Changing the welding conditions as conditions F and G makes it possible to eliminate the number of pits occurring in the scaly beads and improve the design of outer appearance of the scaly beads. Changing the welding condition as condition G makes it possible to make interval G constant in the welding section. In the present exemplary embodiment, as shown in FIG. 9, the plate thickness of base material 17 is simply increased in the welding section as an example. Alternatively, base material 17 may be reversed and the sign of the change rate may be reversed. For example, in a case where the plate thickness is largest at welding start point P1 and is smallest at end point P2, an initial value of end active time T2 can be set to 60 msec and an end value of end active time T2 can be set to 2 msec under condition F so that end active time T2 is simply decreased in the welding section.

As in the present exemplary embodiment, changing the welding condition such that the value of the welding parameter is sloped during arc welding facilitates fine adjustments of a finish shape at the welding spot.

Figure 10:
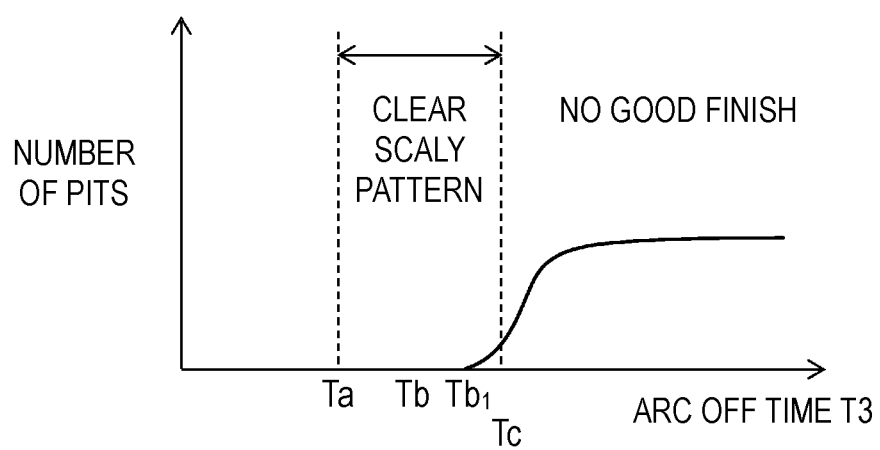
FIG. 10 is a diagram showing a relationship between an arc OFF time and a pit occurrence number.
Figure 11:
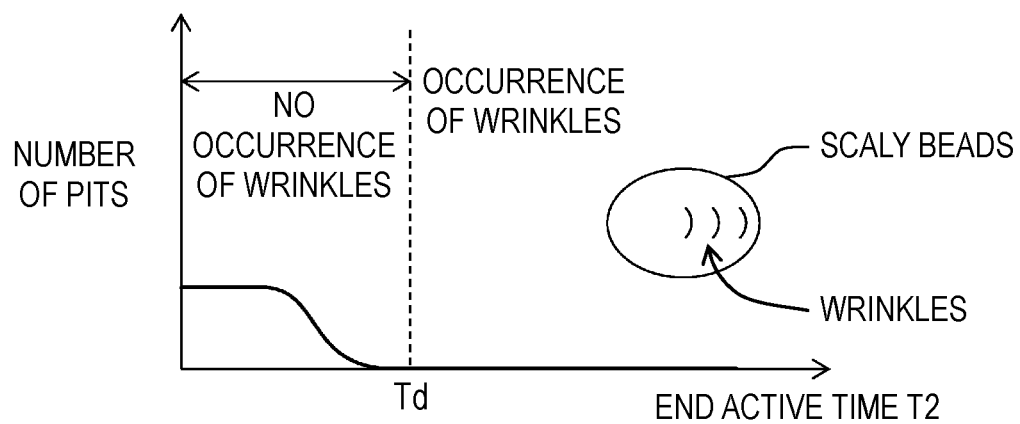
FIG. 11 is a diagram showing a relationship between an end active time and the pit occurrence number.

FIG. 10 shows a relationship between arc OFF time and pit occurrence number, and FIG. 11 shows a relationship between end active time and pit occurrence number. Arc ON time T1 is constant in the example shown in FIG. 10, and arc ON time T1 and arc OFF time T3 are constant in the example shown in FIG. 11.

As shown in FIG. 10, when arc OFF time T3 exceeds predetermined time Tb, the occurrence of pits in the scaly beads starts and increases along with an extension of arc OFF time T3. However, with the occurrence of pits, the welding is generally judged as defective at an appearance inspection of the welding spot. On the other hand, when arc OFF time T3 is too short, heat input to base material 17 becomes excessive to make the ripples in the scale pattern obscured. When arc OFF time T3 is too long, the interval of the ripples becomes too large to deteriorate the design of the outer appearance. Thus, there is an appropriate range of arc OFF time T3 for making clear the scale pattern, with lower limit Ta and upper limit Tb. In this time range, no pits occur in the scaly beads. Times Ta to Tc described above are changed as appropriate according to arc ON time T1. Further, times Ta to Tc are also changed as appropriate by, for example, the shape of the welding spot, the thickness of base material 17, or the material of base material 17. For example, in a case of arc-welding the surface of base material 17 that is a plate material made of soft aluminum (A6061) and having a thickness of 3.0 mm, time Tb is about 120 msec to 170 msec inclusive, Ta is about 120 msec, and Tc is about 240 msec.

As apparent from the foregoing matter, arc OFF time T3 frequently has a narrow range to implement both the suppression of pit occurrence and the clearness of the scale pattern. Accordingly, even if this value is strictly set at the time of setting the initial conditions, the initial condition may not be an optimum value depending on the shape of base material 17, for example. In this case, as in the present exemplary embodiment, sloping the values of the welding parameters including arc OFF time T3 during arc welding and changing and optimizing the welding conditions at each welding section and teaching point position, for example, makes it possible to achieve both the suppression of pit occurrence and the clearness of the scale pattern. In the present exemplary embodiment, the upper limit of the time during which no pits occur in the scaly beads is set to Tb. However, upper time limit Tb1 of tolerable range (see FIG. 10) may be set as variation tolerable upper limit of arc OFF time T3 as far as the value causes the occurrence of pits but an amount of occurrence is tolerable from the terms of welding strength and outer appearance.

As shown in FIG. 11, lengthening end active time T2 causes the pits to start to decrease from a certain time and disappear finally. On the other hand, when end active time T2 exceeds predetermined time Td, wrinkles start to occur in the scaly beads. A reason for the occurrence of the wrinkles will be described. First, in second short circuit welding period Tse, welding wire 18 moves at constant welding speed Vw in a predetermined welding section. On the other hand, in second short circuit welding period Tse, there are alternate repeats of a process in which welding wire 18 and base material 17 cause a short circuit to cool base material 17 and a process in which an arc is generated between welding wire 18 and base material 17 to heat base material 17. Accordingly, according to welding speed Vw, marks of cooled and solidified base material 17 may appear on the surface of base material 17 at predetermined intervals. The marks produce an outer appearance called "wrinkles". Since the amount of heat input is large in pulse welding performed before second short circuit welding, these marks do not appear if end active time T2 is short. However, when end active time T2 becomes long, the amount of heat input to base material 17 decreases and the temperature of base material 17 becomes lower so that wrinkles start to appear. The occurrence of the wrinkles deteriorates the outer appearance of the scaly beads as with the pits and others. Accordingly, end active time T2 needs to be shorter than time Td to prevent the occurrence of wrinkles.

However, end active time T2 frequently has a narrow range to achieve both the suppression of pit occurrence and the clearness of the scale pattern. Accordingly, even if this value is strictly set at the time of setting the initial conditions, the initial condition may not be an optimum value depending on the shape of base material 17, for example. In this case, as in the present exemplary embodiment, sloping the values of the welding parameters including end active time T2 during arc welding and changing and optimizing the welding conditions at each welding section and teaching point position, for example, makes it possible to achieve both the suppression of pit occurrence and the clearness of the scale pattern.

As described above, in the welding method of the present disclosure, the movement of the torch is not stopped in the arc ON period and the arc OFF period. This increases the welding speed. Applying the welding method of the present disclosure to consumable electrode arc welding makes it possible to suppress the occurrence of sputtering by dispersion of droplets of the melted wires and others. In addition, the welding method of the present disclosure makes it possible to suppress the occurrence of blow holes and pits even if the base material is aluminum. The welding method of the present disclosure makes it possible to make a desired finish shape of outer appearance of the scaly beads in a complicated welding target subject in which the plate thickness and the work shape vary in the middle and to change the welding conditions to prevent the occurrence of welding failures.

INDUSTRIAL APPLICABILITY

The arc welding controlling method of the present disclosure makes it possible to easily change the welding conditions and make a desired finish shape of the scaly beads, and is effectively applicable to arc welding of frames of bicycles, motorcycles, automobiles, and others.

REFERENCE MARKS IN THE DRAWINGS

1: input power supply
2: main transformer
3: primary side rectifier
4: switcher
5: DCL (reactor)
6: secondary side rectifier
7: welding current detector
8: welding voltage detector
9: control switcher
10: output controller
11: short circuit welding controller
12: pulse welding controller
13: wire feed speed controller
14: wire feed speed detector
15: arithmetic operation unit
16: arc welding apparatus
17: base material
18: welding wire
19: arc
20: welding chip
21: wire feeder
22: welding condition setter
23: short circuit welding setter
24: pulse welding setter
25: cooling period setter

The invention claimed is:
1. An arc welding control method for controlling arc welding, the arc welding forming a plurality of scaly beads continuously arranged on a base material in a welding cycle, the welding cycle being a sum of an arc ON period and an arc OFF period, the arc ON period being a period during which a welding current flows to a welding wire, the arc OFF period being a period after the arc ON period and during which the welding current does not flow to the welding wire, the arc welding control method comprising:
  setting an initial value of a welding condition for arc welding the base material;
  forming the plurality of scaly beads in a predetermined welding section of the base material while moving a torch holding the welding wire in the predetermined welding section of the base material at a predetermined welding speed; and
  while moving the torch, changing the arc ON period and the arc OFF period continuously of in accordance with any of a lapse time in the forming of the plurality of scaly beads, a distance from a welding start point in the predetermined welding section, or a welding teaching point position so as to satisfy a predetermined finish condition, wherein:

the welding condition includes the arc ON period, the arc OFF period, and a plurality of welding parameters, the plurality of welding parameters including at least one of the welding current, the predetermined welding speed, or an interval between adjacent scaly beads among the plurality of scaly beads;

the arc ON period includes: a first short circuit welding period during which a feed of the welding wire is successively repeated alternately forward and backward to alternately repeat successively a state in which an arc is generated between the base material and the welding wire and a first state in which the base material and the welding wire cause a first short circuit; and a pulse welding period that follows the first short circuit welding period and during which the welding wire is fed forward at a constant wire feed speed and a peak current and a base current alternately flow successively to the welding wire to successively generate the arc between the base material and the welding wire; and during the arc OFF period the welding wire is not fed.

2. The arc welding control method according to claim 1, wherein when the welding condition arc OFF period is changed, the arc OFF period is made longer than the initial value to improve a design of an outer appearance of the plurality of scaly beads.

3. The arc welding control method according to claim 1, wherein when the arc ON period is changed, the arc ON period is made shorter than the initial value to improve a design of an outer appearance of the plurality of scaly beads.

4. The arc welding control method according to claim 1, wherein when the arc OFF period is changed, the arc OFF period is made shorter than the initial value to decrease a number of pits occurring in the plurality of scaly beads.

5. The arc welding control method according to claim 1, wherein when the arc ON period and the arc OFF period are changed, the predetermined welding speed is kept identical to the initial value, and the welding cycle and the interval are changed such that a ratio of the arc ON period to the welding cycle and a ratio of the arc OFF period to the welding cycle are maintained.

6. An arc welding control method for controlling arc welding, the arc welding forming a plurality of scaly beads continuously arranged on a base material in a welding cycle, the welding cycle being a sum of an arc ON period and an arc OFF period, the arc ON period being a period during which a welding current flows to a welding wire, the arc OFF period being a period after the arc ON period and during which the welding current does not flow to the welding wire, the arc welding control method comprising:

setting an initial value of a welding condition for arc welding the base material;

forming the plurality of scaly beads in a predetermined welding section of the base material while moving a torch holding the welding wire in the predetermined welding section of the base material at a predetermined welding speed; and while moving the torch, changing the arc ON period and the arc OFF period continuously in accordance with any of a lapse time in the forming of the plurality of scaly beads, a distance from a welding start point in the predetermined welding section, or a welding teaching point position so as to satisfy a predetermined finish condition, wherein the welding condition includes the arc ON period, the arc OFF period, and a plurality of welding parameters, the plurality of welding parameters including at least one of the welding current, the predetermined welding speed, or an interval between adjacent scaly beads among the plurality of scaly beads, and wherein the arc ON period includes:

a first short circuit welding period during which a feed of the welding wire is successively repeated alternately forward and backward to alternately repeat successively a state in which an arc is generated between the base material and the welding wire and a first state in which the base material and the welding wire cause a first short circuit;

a pulse welding period that follows the first short circuit welding period and during which the welding wire is fed forward at a constant wire feed speed and a peak current and a base current alternately flow successively to the welding wire to successively generate the arc between the base material and the welding wire; and a second short circuit welding period that follows the pulse welding period, and in the second short circuit welding period, the feed of the welding wire is repeated alternately forward and backward to alternately repeat the state in which the arc is generated between the base material and the welding wire and a second state in which the base material and the welding wire cause a second short circuit.

7. The arc welding control method according to claim 6, wherein when the arc ON period is changed, the second short circuit welding period is made longer than the initial value to decrease a number of pits occurring in the plurality of scaly beads.

8. The arc welding control method according to claim 1, wherein when the arc ON period and the arc OFF period are changed, at least one of the plurality of welding parameters is changed continuously in accordance with a shape of the base material.

9. The arc welding control method according to claim 1, wherein when the arc ON period and the arc OFF period are changed, at least one of the plurality of welding parameters is changed continuously in accordance with a temperature change of the base material.

10. The arc welding control method according to claim 1, wherein during the pulse welding period, the welding wire is fed only forward at a constant wire feed speed.

11. The arc welding control method according to claim 10, wherein during the arc OFF period, a welding voltage is zero.

12. The arc welding control method according to claim 1, wherein the lapse time corresponds to an entirety of the forming of the plurality of scaly beads in the arc welding.

13. The arc welding control method according to claim 1, wherein while moving the torch, the predetermined welding speed is constant.

14. The arc welding control method according to claim 1, wherein
while moving the torch, other welding parameters among the plurality of welding parameters different than the arc ON period and the arc OFF period are changed.

15. The arc welding control method according to claim 1, wherein
the torch is moved by a robot.

\* \* \* \* \*